Figure 1:
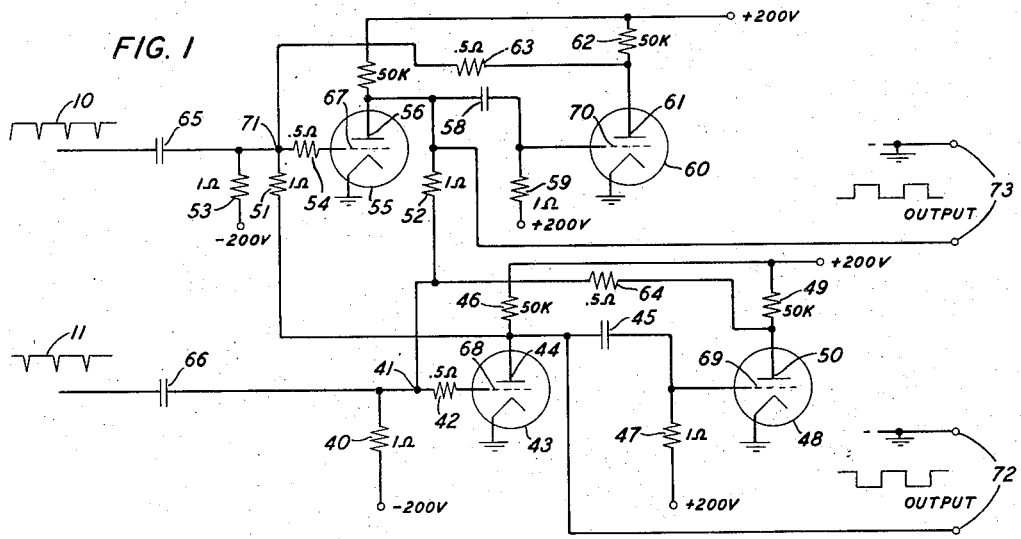

July 26, 1949.  K. H. DAVIS  2,477,047

FREQUENCY DIVIDER CIRCUIT

Filed Sept. 21, 1946

INVENTOR
K. H. DAVIS
BY
Robert J. Sluskey
ATTORNEY

Patented July 26, 1949

2,477,047

UNITED STATES PATENT OFFICE 2,477,047

FREQUENCY DIVIDER CIRCUIT

Kingsbury H. Davis, Bernardsville, N. J., assignor to Bell Telephone Laboratories, Incorporated, New York, N. Y., a corporation of New York Application September 21, 1946, Serial No. 698,483

5 Claims. (Cl. 250—27)

1

This invention relates to electric wave generation, and, more particularly, to the translation of an electric wave of one frequency into one or more electric waves of a different frequency or frequencies.

Prior art circuits for this purpose have generally taken the form of self-oscillating or non-oscillating systems wherein a synchronizing trigger pulse is imposed upon an exponentially rising control voltage. While these arrangements have successfully operated in many applications, there have been numerous instances in which they have been found not to be completely adequate for reliable service.

The self-oscillating type of circuit, as exemplified by the "multivibrator," has a natural period of oscillation and, at a time just preceding that at which the circuit would naturally reverse, it presents a critical period wherein it is particularly susceptible to voltage pulses that will cause premature reversals. This principle is employed in synchronizing these units, whereby they are caused to oscillate at a higher frequency, or shorter period, than they would naturally attain. This controlled period is a combined function of the natural period of the unit and the amplitude of the synchronizing voltage pulse. The effect of variations in these factors is additive, that is, the natural period may be increased by any amount and still there will be a theoretical pulse amplitude that will reverse the multivibrator at the correct time. This approaches the unsatisfactory limit of allowing no tolerance in the amplitude of the pulse where the natural period is allowed to vary to its limit and vice-versa. In practical design of these circuits, a compromise is made whereby both the pulse amplitude and natural frequency are permitted some limited variation.

What has been said regarding the effect of pulse variations in the self-oscillating circuits is equally true in non-oscillating systems in which synchronizing pulses are impressed upon an exponentially rising voltage of a control electrode. As the rising voltage approaches the "cutoff" point of the trigger circuit, there exists a critical period during which small "stray" voltages may cause premature tripping of the unit, or where amplitude variations between successive control pulses may cause erroneous operation. It is obvious that, as the operating frequency is increased, or as the step-down ratio is increased, a greater number of synchronizing pulses are impressed upon the unit per time interval. As this number increases, the amounts by which the pulse amplitude and the natural frequency may vary from optimum values without causing loss of synchronism are decreased.

It is accordingly an object of this invention to make available a circuit that is particularly well adapted for frequency division work, in that variations in the control pulse amplitude and variations in the natural period of oscillation are not additive in their effects.

A further object is the provision of a frequency divider which will not support self-oscillations, but which stands by indefinitely in an attending position until the synchronizing signal is received.

A still further object is to provide a circuit for frequency reduction work in which reasonably expectable variations in the amplitude of the controlling pulse are not operatively effective.

Figure 2:
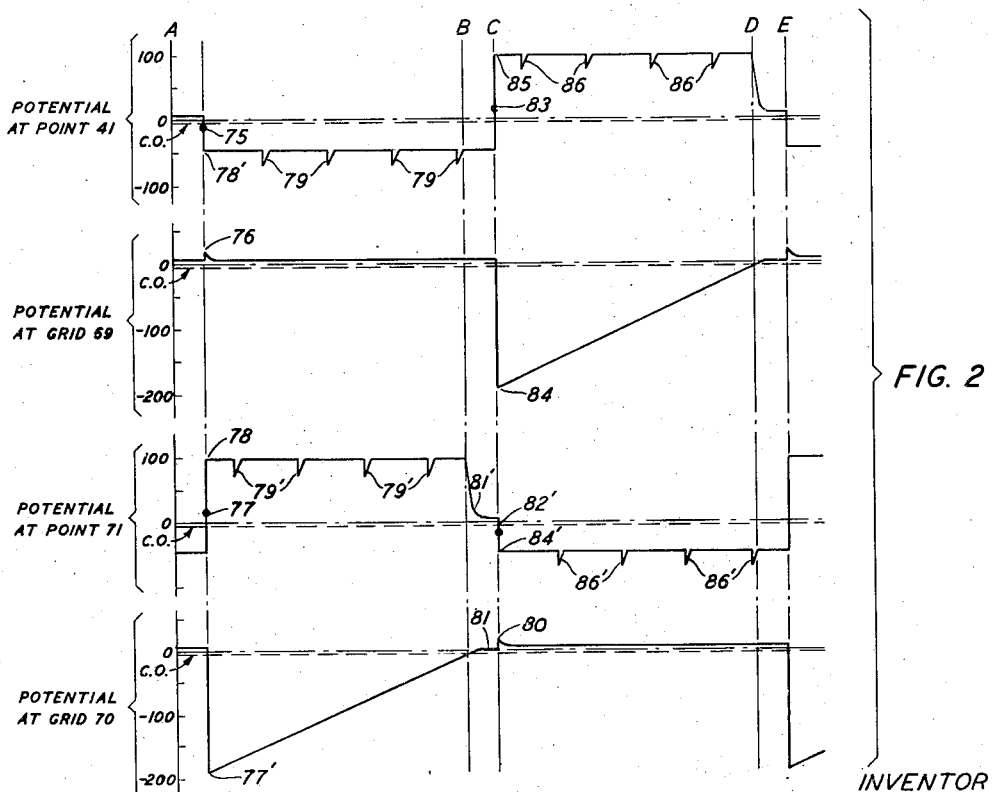

Other objects and advantages will become apparent from the following description of one preferred embodiment, when considered with reference to the drawing, in which:

Fig. 1 represents schematically the arrangement of a frequency dividing circuit in accordance with the present invention; and Fig. 2 illustrates biasing potentials and superposed control voltage pulses for one operating cycle of the frequency divider of Fig. 1.

As shown in schematic form in Fig. 1, the frequency dividing arrangement comprises two substantially equivalent portions. Each portion performs a holding and a timing operation. The holding tubes 43 and 55 are so disposed that when one is saturated the other tube is cut off. This is a stable condition and, in the absence of any control voltages, it will persist. The timing tubes 48 or 60 are arranged to be cut off by the anode voltage drop accompanying saturation of the associated holding tube. When one of the timing tubes is so cut off, it immediately applies a high positive voltage to the control electrode of its associated holding tube and effectively raises the potential of this electrode beyond the effective range of any reasonably expectable control pulse. Variations in the potential at the anodes 44 and 56 of the holding tubes 43 and 55 are made available at output terminals 72 and 73.

The circuit departs from the conventional multivibrator in that it will not sustain self-oscillations, but, at a predetermined time after the timing tube assumes control of the holding tube's control electrode, it relinquishes this control, and conditions the holding tube for reversal by the next succeeding control pulse. If no control pulse is forthcoming, the circuit remains in a ready or stand-by condition.

The timing tubes 48 and 60 use conventional resistor-capacitor charging arrangements 45, 47 and 58, 59, the values of the components of which are chosen in the usual well-known manner. By a proper choice of these values, the timing tubes render the holding tubes 43 and 55 unresponsive to control pulses for any desired number of pulses. The timing arrangement differs somewhat from that used in the conventional multivibrator, since in this arrangement the timing tube saturates one-half period of the controlling frequency before the frequency divider is to be reversed, instead of one-half period of the controlling frequency after the desired reversal time, as is done in the conventional controlled multivibrator. Accordingly, for odd ratios of step-down, the natural period should be arranged so that the timing tube, 48 or 60, saturates at $r-1/2$ periods of the controlling frequency after its control electrode has been driven negative, where $r$ is equivalent to the step-down ratio. In the case of even ratios of step-down, the timing of the two sides will differ in the same manner, and for essentially the same reason, that it varies in the even ratio step-down multivibrator when arranged for push-pull synchronizing control. In this case the natural periods will be such that one timing tube saturates at $r/2$ periods of the controlling frequency, and the other timing tube saturates at $r-2/2$ periods of the controlling frequency after having been cut off.

A further departure is made from the conventional multivibrator arrangement in supplying control electrode potentials to the two holding tubes 43 and 55. In order to permit maximum variations in the control pulse amplitude it is necessary to effectively carry the control electrodes well past cut-off and saturation points. Because grid current starts as soon as the control grid electrode exceeds zero bias it is difficult to raise this electrode potential highly positive. To permit what effectively amounts to carrying the grid electrode to a high positive potential, relatively high value decoupling resistors 42 and 54 are inserted in the grid circuit between the electrode proper and its biasing point 41 or 71. Biasing points 41 and 71 are junction points on the voltage divider circuits comprising resistor 53 in series with parallel resistors 51, 63 and resistor 40 in series with the parallel resistors 52 and 64. One end of each divider is connected to constant negative potential. The potentials at points 71 and 41 increase or decrease substantially in unison with the changes in positive voltage supplied at the anodes 44, 61 and 50, 56, respectively. By a suitable choice of divider resistor values, the potential at these points, 41 and 71, may be made sufficiently positive to permit large variations in the control pulse amplitude without causing premature reversals.

In referring to Fig. 2, it should be noted that the first and third diagrams show the potential at the biasing points 41 and 71 respectively, while the second and fourth diagrams display potentials at the control electrodes 69 and 70. Potentials at the biasing points 41 and 71, rather than at the associated control electrodes 68 and 67, are shown in order to demonstrate more clearly the large potential variation that may be permitted at these biasing points without affecting the circuit operation.

With reference to the circuit arrangement of Fig. 1 and the control voltage diagrams of Fig. 2, consider the operation of the circuit when negative control voltage waves 10 and 11, in phase opposition, are applied through coupling condensers 65 and 66 to the holding tube control electrodes 67 and 68. Assume at time "A" (Fig. 2), that tube 43 is saturated, and that timing tube 48 has only recently changed from a non-conduction to a saturated condition. The complementary holding tube 55 is cut off and its timing tube 60 is approaching the end of its saturated period. Negative control pulse 75 is impressed through the coupling condenser 66 to the biasing point 41. The potential at point 41 drops below the value corresponding to cut-off potential at the control electrode 68, and there is an attending voltage increase at the anode 44. This increase is transferred by way of capacitor 45 to the saturated control electrode 69 where it appears as an ineffective positive pulse 76. This anode voltage increase also, by way of coupling resistor 51, increases the potential at point 71 to a level 77, which level exceeds the saturation voltage for the control electrode 67 and greatly reduces the potential at the anode 56. The sudden change in this anode potential is communicated to the timing tube 60, by way of the timing circuit capacitor 58, to drive the control electrode 70 to a high negative potential 77' and cut off the timing tube 60. The timing circuit, comprising capacitor 58 and resistor 59, being returned to the supply of positive potential, starts charging toward that value essentially as a linear function, and accurately measures the cut-off period of the timing tube 60. The concurrent rise in voltage at the anode 61 is fed back by way of resistor 63 to the biasing point 71, to carry this point to a high positive voltage level 78. Control electrode 67 is also carried positive and draws current. Because of the voltage drop across the large decoupling resistor 54, in its current conduction path, the control electrode 67 will assume a potential level slightly in excess of zero for all potentials exceeding zero at the biasing point 71. The high positive potential at point 71 renders the control electrode 67 insensitive to the succeeding negative control pulses 79'. This condition will maintain until the control electrode 70 again acquires sufficient positive bias to permit conduction in the timing tube 60 which occurs at time "B." In addition to negatively charging the timing circuit 58, 59, the decreased potential at the anode 56 holds, by way of the resistor 52, the potential of biasing point 41 at a high negative potential 78'. As no current is flowing, the control electrode 68 assumes this high negative potential, and is insensitive to negative control pulses 79 and to any reasonably expectable "stray" positive pulses (none shown).

At time "B," the timing circuit 58, 59 has charged to a potential that corresponds to the cut-off potential at the grid 70 of the timing tube 60, and current conduction is started therein. The grid potential continues increasing to zero potential and current saturation at point 81. Simultaneously, the decreasing anode potential at the anode 61 decreases the voltage across the voltage divider circuit containing resistor 63 and reduces the potential at the biasing point 71. The potential at the biasing point 71 is reduced to the near zero level 81', which drop is not sufficient to affect the potential at the control electrode 67, but does place this electrode in a position to be reduced below cut-off potential by the next succeeding negative control pulse 82' that is received at point 71.

At time "C," the negative control pulse 82' momentarily cuts off holding tube 55, and gives rise to a high positive voltage pulse at its anode 56. This positive pulse, by way of resistor 52, carries the potential at the biasing point 41 to positive level 83, which is sufficient to saturate the holding tube 43 and decrease the potential at its anode 44. In the manner previously described when the holding tube 43 was made non-conducting, the positive pulse 80, which is transferred through capacitor 58 to the saturated control element 70, is ineffective. The potential at biasing point 71 is lowered to a negative level 84' and maintained there. The timing circuit 45, 47 is negatively charged and carries the control element 69 to its negative level 84, and the biasing point 41 is raised to, and maintained at, its high positive level 85. In this condition, the negative control pulses 86 are ineffective in controlling the potential of the control electrode 68. The negative control pulses 86' have no effect upon the control electrode 67 as it has assumed the high negative potential of its biasing point 71. These conditions will exist until the timing tube 48 again becomes conductive, at time "D," and prepares the circuit for another reversal at time "E" in the manner previously described.

It should be noted that, at times "C" or "E," if no control pulse is received, the circuit is not reversed but maintains its stability and assumes a "ready" position until a reversing pulse is received. This characteristic is of considerable value in a frequency dividing arrangement wherein it is desired that no output be produced if the synchronizing control pulses are interrupted.

Although in the foregoing description, the control waves 10 and 11 were assumed to comprise only negative pulses this condition is not necessarily controlling. It should be appreciated that these control waves may include both positive and negative pulses. If positive pulses are included it is possible that, in case of unfavorable voltage phasings, the observed operating margins may be slightly less favorable than in the described embodiment.

Although this invention has been described with reference to a specific application, and specific circuit constants have been shown by way of example, it should be understood that it is not to be considered as limited thereto, since other applications thereof, not departing from the spirit and scope of the invention will readily occur to those skilled in the art to which the invention pertains.

What is claimed is:

1. A frequency divider circuit in which reversals in response to controlling synchronizing pulses are substantially independent of variations in the amplitude of said pulses, said circuit comprising a plurality of space discharge devices, each having an anode, a cathode, and at least one control grid element, and control grid-cathode and anode-cathode circuit therefor, each of said anode-cathode circuits including a source of positive potential resistively connected to the anode thereof, two of said discharge devices operating as holding means, and two other of said discharge devices operating as timing means, each of said holding means having an impedance connection between its anode and the control grid element of said other holding means, the anode of each of said holding means being connected through a capacitive circuit to the control grid element of a said timing means, each of said timing means having its anode resistively connected to the control grid element of its associated holding means, said last mentioned control grid elements being resistively connected to a source of negative potential, and said control grid elements of said timing means being resistively connected to a source of positive potential, terminal connection means for supplying said controlling synchronizing pulses to the control grid elements of said holding means, whereby, upon receipt of a negative synchronizing control pulse by one holding means, said one holding means is rendered insensitive to succeeding negative synchronizing control pulses, and said other holding means is rendered responsive to said negative synchronizing control pulse next succeeding a predetermined number of said succeeding control pulses.

2. A frequency dividing circuit comprising a plurality of electron discharge devices, each of said devices including at least a cathode, an anode and a control grid electrode, control grid-cathode circuits and anode-cathode circuits therefor, said anode-cathode circuits comprising a source of positive potential resistively connected to said anodes, input terminal means connected to the control grid electrodes of two of said devices to supply thereto electric control waves of the frequency to be divided, resistive means interconnecting the control grid electrode of each of two of said devices with the anode electrode of the other of said two devices, and means for controlling the potential of said control grid electrodes whereby said devices are alternately responsive to said supplied control waves, said control means comprising another two of said electron discharge devices, each of said last mentioned devices having its control grid electrode connected to a source of positive potential through a direct current conductive path, having the same electrode connected through an impedance path to the anode of one of said first-mentioned two electron discharge devices, and having its anode connected through a direct current conductive path to the control grid electrode of the same first-mentioned device with which its control grid electrode is associated.

3. In combination, in a frequency dividing circuit comprising two substantially equivalent complementary portions, each of said portions comprising a first and a second electron discharge device, each such device comprising an anode, a cathode and at least one interposed control grid element, control grid-cathode circuits and anode-cathode circuits therefor, said anode-cathode circuits comprising a source of positive potential resistively connected to said anodes, the anode of each of said first devices being connected through an impedance path to the control grid element of said other first electron device whereby the control element potential of each of said first devices varies as the anode potential of each of said other first device is varied, each of said first discharge devices being interconnected to one of said second discharge devices by a time-constant circuit connecting the anode of said first device to the control grid element of its associated second device, and by an impedance path between the anode of said second device and the control grid element of said first device, whereby the potential of said control grid element of said first device is held positive with respect to its cathode whenever its associated second discharge device is rendered non-conductive.

4. A frequency dividing circuit comprising a plurality of electron discharge devices, each of said devices including an anode, a cathode and at least one control grid element, control grid-cathode circuits and anode-cathode circuits therefor, said anode-cathode circuits comprising a source of positive potential resistively connected to said anodes, two of said devices each having its control grid element interconnected with the anode of the other of the said two devices and having input terminal means connected to the control element whereby control electric waves of the frequency to be divided are supplied to the control elements of said two devices, means for controlling the potential of said control elements whereby said discharge devices are alternately made responsive to said control electric waves, said means comprising two additional of said electron discharge devices each having its anode and control grid element connected by separate conductive paths to the control grid element and anode, respectively, of one of said first-mentioned two devices, whereby the potential of the control element of each of said first-mentioned devices varies directly as the potential of the connected anode of one of said additional electron devices.

5. A signal wave frequency dividing system comprising two conjugate circuit branches, each of said branches comprising a holding electron discharge device and a complementary timing electron discharge device including anode, cathode and control grid electrodes, anode-cathode circuits and control grid-cathode circuits therefor, each of said anode-cathode circuits comprising a source of positive anode potential and an anode load impedance in series connection, separate signal input means connected to each of said holding electron discharge devices, an impedance coupling circuit interconnecting the anode of each of said holding devices and the control grid of its complementary timing device, each of said coupling circuits possessing a time-constant characteristic that exceeds the period of the signal wave the frequency of which is to be divided, means for rendering each of said holding devices insensitive to input signal waves during the interval when its complementary timing device is nonconductive, means responsive to current conduction in each of said timing devices for rendering each of said complementary holding devices receptive to said input signal wave, means for initiating current conduction in each of said holding devices coincidentally with the cessation of current conduction in the other one of said conjugately related holding devices, and output circuit terminals for the receipt of the frequency reduced output wave.

KINGSBURY H. DAVIS.

REFERENCES CITED

The following references are of record in the file of this patent:

UNITED STATES PATENTS

| Number | Name | Date |
| --- | --- | --- |
| 2,289,987 | Norton | July 14, 1942 |
| 2,289,988 | Norton | July 14, 1942 |
| 2,304,813 | Gibbs | Dec. 15, 1942 |